(12) United States Patent
Nunnelley

(10) Patent No.: US 7,512,804 B2
(45) Date of Patent: *Mar. 31, 2009

(54) DATA STORAGE SECURITY APPARATUS AND SYSTEM

(75) Inventor: Lewis Lee Nunnelley, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 907 days.

This patent is subject to a terminal disclaimer.

(21) Appl. No.: 10/976,392

(22) Filed: Oct. 29, 2004

(65) Prior Publication Data

US 2006/0095794 A1 May 4, 2006

(51) Int. Cl.
*H04L 9/00* (2006.01)
*H04L 9/32* (2006.01)
*G06F 11/30* (2006.01)

(52) U.S. Cl. .................. 713/184; 713/185; 713/186; 713/187; 713/193; 726/27; 726/28; 726/29; 726/30; 380/42; 380/43

(58) Field of Classification Search .......... 713/184
See application file for complete search history.

(56) References Cited

U.S. PATENT DOCUMENTS

| 5,282,247 | A | 1/1994 | McLean et al. | 380/4 |
|---|---|---|---|---|
| 5,375,243 | A | 12/1994 | Parzych et al. | 395/725 |
| 6,012,146 | A | 1/2000 | Liebenow | 713/202 |
| 6,145,053 | A | 11/2000 | Smith | 711/112 |
| 6,199,163 | B1 | 3/2001 | Dumas et al. | 713/183 |
| 6,587,032 | B2 | 7/2003 | Armingaud | |
| 6,912,653 | B2 * | 6/2005 | Gohl | 713/155 |
| 7,007,145 | B2 | 2/2006 | Schrodinger et al. | |
| 7,043,640 | B2 * | 5/2006 | Pritchard et al. | 713/184 |
| 2003/0028812 | A1 | 2/2003 | Stultz et al. | |
| 2003/0046593 | A1 | 3/2003 | Xie et al. | 703/202 |
| 2004/0037174 | A1 | 2/2004 | Uchida et al. | 369/30.36 |
| 2005/0038969 | A1 | 2/2005 | Schrodinger et al. | |

(Continued)

FOREIGN PATENT DOCUMENTS

JP    4195278    7/1992

(Continued)

OTHER PUBLICATIONS

"Method For Normal/Maximum Level on Hard Disk Password", IBM Technical Disclosure Bulletin, Jun. 1994, pp. 443-444.

*Primary Examiner*—Longbit Chai
(74) *Attorney, Agent, or Firm*—Kunzler & McKenzie

(57) ABSTRACT

A data storage device is secured by extracting timing information encoded within a password-related symbol stream received by the storage device and denying access if the timing information is incorrect or the symbol stream is not identical to a valid authentication sequence. In one embodiment, each symbol corresponds to a password, and at least one symbol is transmitted within a specified timing window while at least one other symbol must be transmitted at a random time that varies with each authentication attempt. In certain embodiments, a computing device associated with the data storage device is configured to provide a single password prompt, receive a character sequence corresponding to a plurality of passwords from a user, and communicate an encrypted symbol stream to the storage device with a specified timing pattern imposed thereon.

17 Claims, 6 Drawing Sheets

U.S. PATENT DOCUMENTS

2006/0041756 A1    2/2006    Ashok et al.

FOREIGN PATENT DOCUMENTS

| | | |
|---|---|---|
| JP | 8263383 | 10/1996 |
| JP | 10143443 | 5/1998 |
| JP | 2001306266 | 4/2000 |
| JP | 2000259276 | 9/2000 |
| JP | 2004062796 | 2/2004 |

* cited by examiner

DATA STORAGE SECURITY APPARATUS AND SYSTEM

BACKGROUND OF THE INVENTION

1. Field of the Invention

The invention relates generally to devices, methods, and systems for securing data bearing media. Specifically, the invention relates to devices, methods, and systems for preventing unauthorized access to data bearing media.

2. Description of the Related Art

Data storage devices, such as disk drives, are currently used in a variety of machines including computers, car stereos, vending machines, media players, and automated teller machines (ATMs). In the foreseeable future, data storage devices will become increasingly portable and will be introduced into additional machines and environments due to their ever-increasing storage capacity, shrinking footprint, and decreasing price.

Data storage devices often contain large amounts of sensitive data such as financial information, personal information, business plans, and more. As data storage devices become increasingly pervasive, interchangeable, and portable, the ability to secure data storage devices, particularly portable devices, is becoming increasingly important.

One of many methods for breaching a data storage device is to remove the data storage device from a machine and access the data storage device in another location with a machine or computer system configured for that purpose. For example, an unauthorized party may attempt to access the data storage device of an ATM by physically removing the data storage device from the ATM, transporting it to a remote location, and connecting it to a computer system designed to generate a large number of passwords and associated access attempts in a short period of time. Consequently, the unauthorized party may gain access to the valuable information stored upon the stolen data storage device.

Over the years, a variety of techniques have been developed that attempt to protect data storage devices from unwanted intrusion. For example, some data storage devices prompt the user for multiple passwords in order to decrease the probability of successful intrusion. Other storage devices impose a delay before responding to a password in order to reduce the rate at which passwords may be entered. While useful in reducing the likelihood of intrusion, such methods may be overcome by a persistent intruder.

While invulnerable protection from intrusion is unattainable, what is needed is a data storage device that further reduces the probability of successful intrusion by an unauthorized party. More specifically, what is needed is a data storage device that prevents unauthorized access by imposing timing requirements on password related data and an associated computing device that provides password-related data with the prescribed timing requirements imposed thereon.

SUMMARY OF THE INVENTION

The present invention has been developed in response to the present state of the art, and in particular, in response to the problems and needs in the art that have not yet been fully solved by currently available storage device security means and methods. Accordingly, the present invention provides a storage device security apparatus, method, and system that overcome many or all of the above-discussed shortcomings in the art.

In certain embodiments, the present invention imposes timing constraints on password-related data used to gain access to data stored on a storage device. The timing constraints add another dimension of control and communication that significantly increase the barriers to unauthorized access to storage data.

In one aspect of the present invention, an apparatus for controlling access to data stored on a data bearing medium includes, in one embodiment, a data bearing medium configured to store data, a receiving buffer configured to receive a symbol stream, a timing module configured to provide timing information, and an authentication module configured to grant access to the data storage device if the symbol stream is identical to an authentication sequence and the symbol stream conforms to particular timing constraints. In one embodiment, access to the data storage device is denied if a selected symbol is not received within a specified timing window. The received symbols may be any information unit convenient to communication such as bits, bytes, characters, or passwords, and may be encrypted for additional security. Timing windows may be imposed on one or more of the communicated symbols.

A timing window may be relative to a start symbol within the symbol stream. In one embodiment, the start symbol corresponds to a selected ordinal position within the symbol stream. In another embodiment, the start symbol is a symbol with a particular value. In certain embodiments, one or more symbols are designated as random-timing symbols that must vary in timing with each authentication attempt in order to gain access to the data.

In one embodiment, the symbol stream corresponds to a plurality of passwords and the authentication module is further configured to require re-authentication in response to a timeout event. In certain embodiments, the symbols are encrypted, and the apparatus includes a decryption module configured to decrypt the symbol stream. In one embodiment, the encryption key may be dynamically changed.

In another aspect of the present invention, an apparatus for controlling access to a data storage device includes an interface module configured to receive a character sequence from a user in response to providing a password prompt to the user, and a storage access module configured to communicate a symbol stream corresponding to the character sequence to a password-protected data storage device with the prescribed timing constraints imposed thereon. In one embodiment, the symbol stream corresponds to a plurality of passwords, and the interface module is configured to receive a character sequence comprising a plurality of passwords in response to a single password prompt.

The interface module may also be configured to omit notification of unsuccessful access to the data storage device and defer notification of successful access to the data storage device. In one embodiment, notification of successful access is deferred for a random wait interval. Deferring notification for a random wait interval requires waiting for the longest possible interval before one can conclude that an access attempt has failed. However, successful attempts will on average be acknowledged at the shorter average wait interval.

The apparatus may also include a timing generator configured to generate the timing window and an encryption module configured to encrypt the symbol stream. In one embodiment, the timing generator is further configured to generate random timings for one or more random-timing symbols.

In certain embodiments, the apparatus for controlling access to data stored on a data bearing medium and the apparatus for controlling access to a data storage device may be combined into a system that provides means for securely storing, accessing, and processing data. In one embodiment, the system includes a password-protected data storage device configured to store data on a data bearing medium, a display configured to display a password prompt to a user, and an input device configured to provide means for inputting a character sequence.

The system may also include a processing module configured to communicate a symbol stream corresponding to the user-provided character sequence to the password-protected data storage device wherein at least one selected symbol within the symbol stream is transmitted within a specified timing window. The data storage device may be configured to provide access to the data on the data bearing medium if the symbol stream is identical to an authentication sequence and at least one selected symbol within the symbol stream is received within a specified timing window. The processing module, display, and input device may partially or wholly form a computing device associated with the storage device such as a computer, a workstation, a pocket computer, an appliance, a media player, a mobile telephone, an electronic organizer, a media player, or the like.

Imposing timing information on password-related data such as the described symbol stream improves the security of the present invention over the prior art. The timing of such symbols is preferably generated and deciphered by machine rather than a user in order to increase the precision required to gain access to secured data. The required timing is also not accessible to the user thus increasing security over previous solutions. In one embodiment, the required timing may be dynamically changed to further increase security.

In certain embodiments, specialized support hardware such as timing circuits and data queues facilitates imposing and requiring timing precision on a standard communication interface that cannot be achieve on devices without such support circuitry. Thus security is increased while maintaining compatibility with existing devices and systems that do not support the increased security of symbol timing.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The various elements and aspects of the present invention facilitate controlling access to a data storage device. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
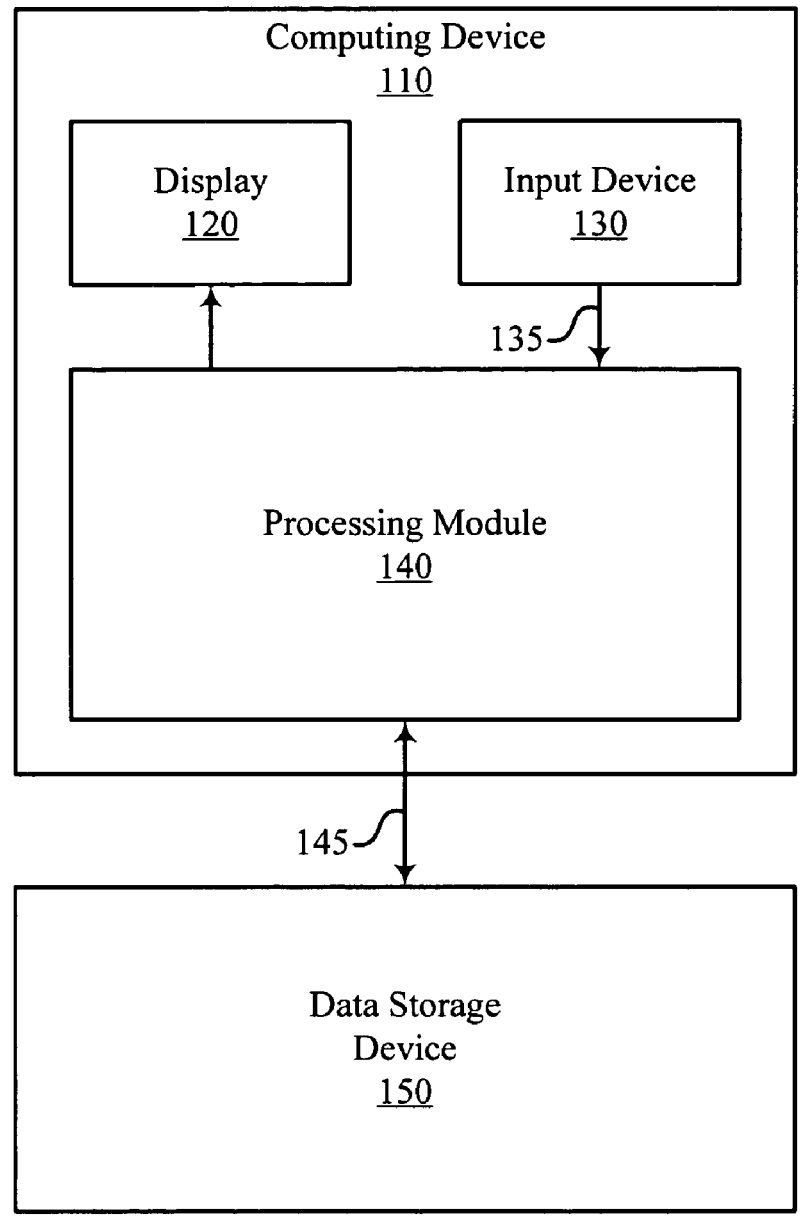
FIG. 1 is a block diagram depicting one embodiment of a storage access system of the present invention.

FIG. 1 illustrates one embodiment of a storage access system 100 of the present invention. The depicted storage access system 100 includes a computing device 110 having therein a display 120, an input device 130, and a processing module 140 communicating with a data storage device 150. Although similar to prior art computing systems, the storage access system 100 provides additional functionality that improves data security.

The display 120 enables the computing device 110 to display visual information such as input prompts and menu options to a user. The input device 130 provides a user with means to input information such as menu selections and passwords. In the depicted embodiment, the input device 130 enables a user to input a character sequence 135 comprising one or more passwords in response to a password prompt presented by the display 120.

The processing module 140 may comprise a CPU and program memory (not shown) that enables the computing device 110 to execute machine codes. The machine codes may be organized into software modules that provide particular functionality to the computing device 110. The processing module 140 may be configured to receive the character sequence 135 from the input device 130 and provide a symbol stream 145 corresponding to the character sequence 135 to the data storage device 150.

The symbols within the symbol stream 145 may be any information unit convenient to communication such as bits, bytes, characters, or passwords, and may be encrypted for additional security. In one embodiment, each symbol corresponds to a password or line of text. In another embodiment, each symbol corresponds to a password character.

Timing constraints such as timing windows may be imposed on one or more of the communicated symbols. In one embodiment, each timing window may be relative to a start symbol, and the start symbol may correspond to a selected ordinal position within the symbol stream 145. In one embodiment, the processing module 140 may be further configured to randomize a transmission time of random-timing symbols or change the encryption key with which the symbol stream 145 is encrypted.

The data storage device 110 may comprise a data bearing medium such as a rotational magnetic medium (not shown). Also, the data storage device 150 may be configured to receive the symbol stream 145 and grant access to the data bearing medium only if the symbol stream 145 corresponds to a valid authentication sequence and conforms the aforementioned timing constraints. Requiring conformance to timing constraints improves the security of the data storage device 150 and the storage access system 100 over previous solutions.

Figure 2A:
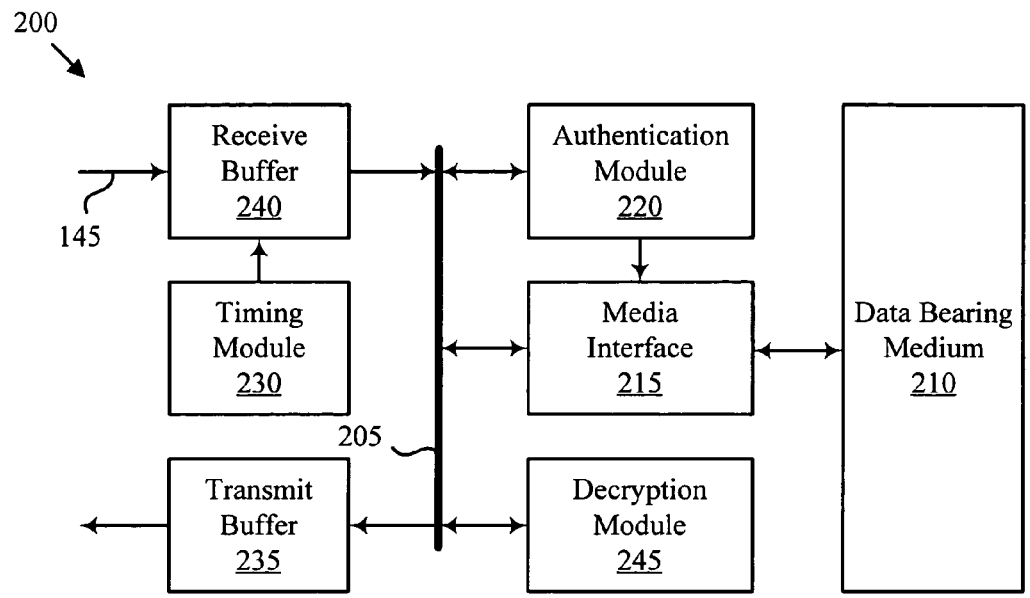
FIG. 2a is a block diagram depicting one embodiment of a data storage device of the present invention.

FIG. 2a illustrates one embodiment of a data storage device 200 of the present invention. As depicted, the data storage device 200 includes a storage bus 205, a data bearing medium 210 and media interface 215, an authentication module 220, a timing module 230, a transmit buffer 235, a receiving buffer 240, and a decryption module 245. The data storage device 200 is one example of the data storage device 150 depicted in FIG. 1. The various modules and components of the data storage device 200 function harmoniously to receive and authenticate a symbol stream 145 corresponding to a password or set of passwords, as a prerequisite to granting access to the data bearing medium 210.

The depicted embodiment includes a storage bus 205 which facilitates communication among the various modules of the data storage device 200. The data bearing medium 210 provides a medium for storing data. In one embodiment, the data bearing medium 210 is a rotational magnetic medium common to disk drives.

The authentication module 220 verifies the validity of the symbol stream 145 as a condition to granting access to the data bearing medium 210. In certain embodiments, the symbol stream 145 is considered valid if it is identical to an authentication sequence stored within the authentication module 220 and specific timing constraints are met. In one embodiment, the authentication module 220 may also change the timing constraints required for subsequent access and inform the computing device 110 of such a change. Alternately, the computing device 110 may request such a change.

The authentication module 220, or another module associated therewith, may be configured to defer notification of successful authentication. In one embodiment, a deferral interval associated with deferred notification is increased with each unsuccessful authentication attempt. Deferring notification reduces the rate at which attempts may be generated by an intruding party. In one embodiment, notification is deferred for a randomly selected interval in order to increase the ambiguity to an intruding party.

The authentication module 220 may also eliminate any notification of failure and only provide notification of success. Reducing or eliminating feedback further reduces the probability of unauthorized access to the data storage device 200. Additionally, in certain embodiments, the authentication module 220 may be configured to require re-authentication in response to a timeout event. In one embodiment, a timeout event is generated when an interval between two commands received by the data bearing medium 210 is greater than a pre-designated interval. In certain embodiments, a timeout event may also occur if the data storage device 200 receives a specified command or series of commands.

The timing module 230 may be configured to provide timing information corresponding to the arrival times of symbols. In one embodiment, the timing information for each symbol is presented to the receiving buffer 240. In another embodiment, the timing information for symbols is presented directly to the authentication module 220.

The receiving buffer 240 receives the symbol stream 145 and holds the symbols until needed. The decryption module 245 may be configured to communicate with the receiving buffer 240 to decrypt the symbol stream 145. In certain embodiments, the decryption module 245 is further configured to accept a new encryption key.

Figure 2B:
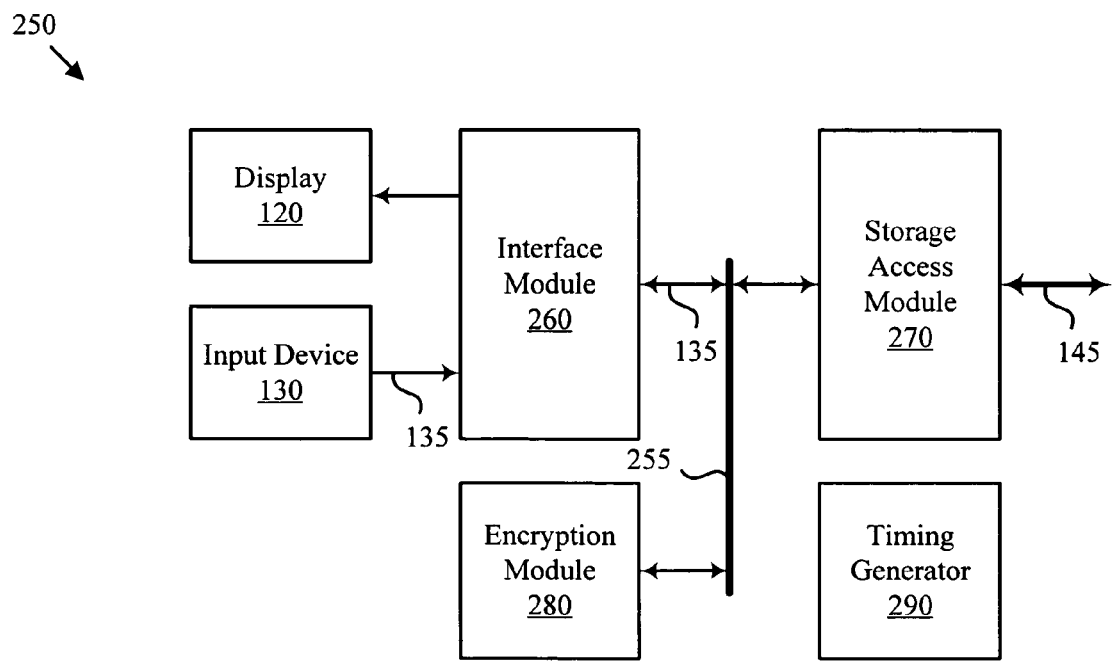
FIG. 2b is a block diagram depicting one embodiment of a protected-storage computing device of the present invention.

FIG. 2b illustrates one embodiment of a protected-storage computing device 250 of the present invention. As depicted, the protected-storage computing device 250 includes a computing bus 255, an interface module 260, a storage access module 270, an encryption module 280, and a timing generator 290. The depicted modules function harmoniously to receive a character sequence 135 from a user and communicate a symbol stream 145 corresponding to the character sequence 135, with specific timing constraints imposed thereon, to a data storage device. The protected-storage computing device 250 is one example of the computing device 110 depicted in FIG. 1.

The depicted embodiment of the protected-storage computing device 250 includes a computing bus 255 which facilitates internal communication among the various modules that comprise the protected-storage computing device 250. For example, the interface module 260 may be configured to receive a character sequence 135 from a user in response to providing the user a password prompt and provide data corresponding to the character sequence via the computing bus 255 to the storage access module 270 or the encryption module 280. In varying embodiments, the character sequence 135 may contain one or more user-entered passwords.

The storage access module 270 may be configured transmit a symbol stream 145 corresponding to the character sequence 135 to a storage device such as the data storage device 200. The symbols stream 145 may have specific timing constraints provided by the timing generator 290.

The encryption module 280 may be configured to communicate with the storage access module 270 via the computing bus 255 to encrypt the symbol stream 145 previous to transmission to the storage device. In certain embodiments, the encryption module 280 may be further configured to dynamically receive a new encryption key.

The timing generator 290 generates a timing pattern that is imposed on the symbol stream 145 transmitted to the data storage device 200 by the storage access module 270. In certain embodiments, the timing generator 290 may be configured to generate specific timings for certain selected symbols and random timings for other symbols referred to as random-timing symbols. The use of random-timing symbols may serve to confuse an intruder attempting to gain unauthorized access and increase the security of the present invention over previous solutions.

Figure 3:
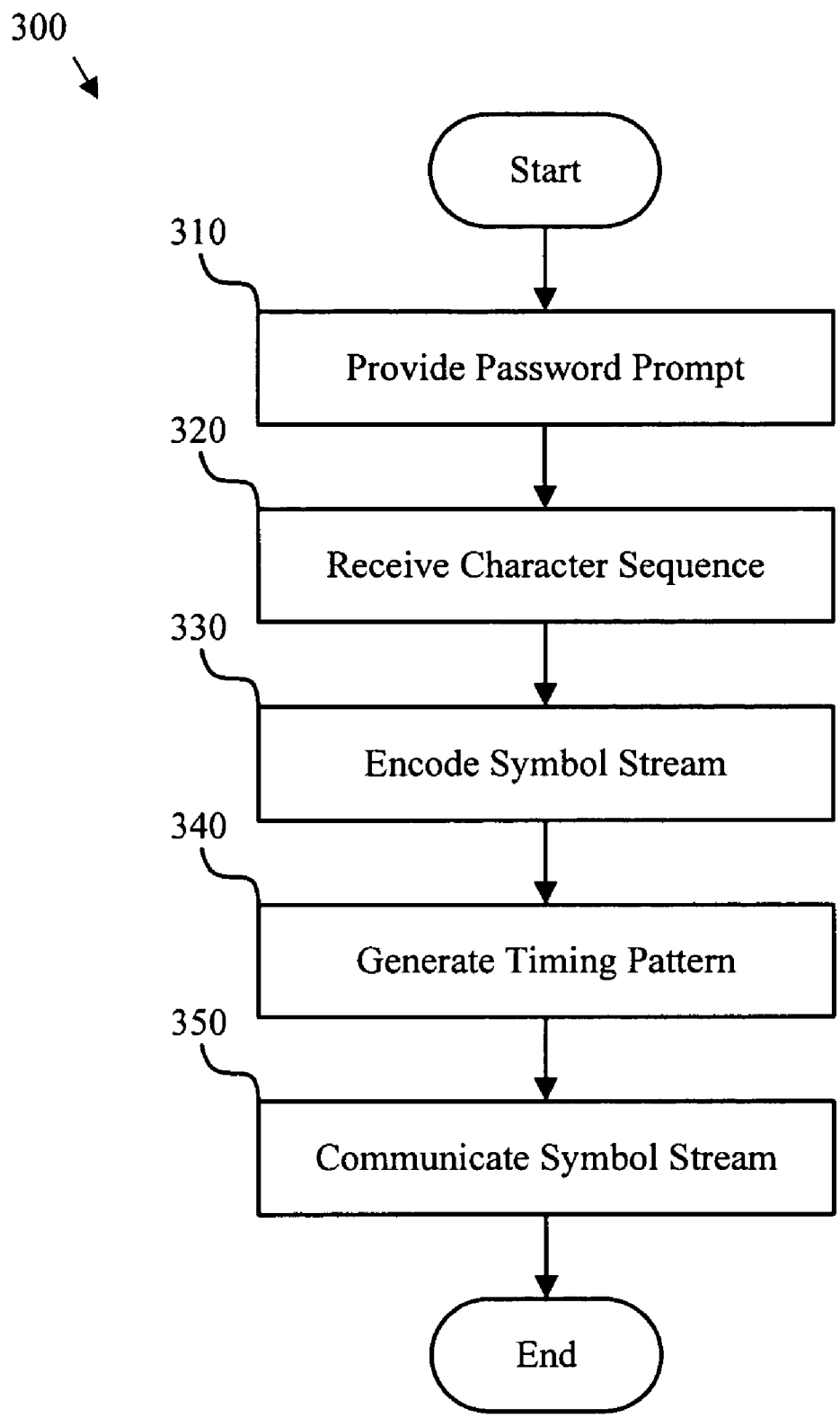
FIG. 3 is a flow chart diagram depicting one embodiment of a storage access method of the present invention.

FIG. 3 is a flow chart diagram depicting one embodiment of a storage access method 300 of the present invention. The depicted storage access method 300 includes providing 310 a password prompt, receiving 320 a character sequence from a user, encoding 330 a symbol stream, generating 340 a timing pattern, and communicating 350 the symbol stream with the specified timing pattern. The storage access method 300 may be conducted independent of, or in conjunction with, the computing device 110 depicted in FIG. 1 or the computing device 250 depicted in FIG. 2.

Providing 310 a password prompt may include prompting a user to enter one or more passwords. In certain embodiments, the number of passwords prompted is different than the number of passwords required by the system 100, such that an intruder may not visually determine the number of required passwords. In one embodiment, a multi-line entry box (not shown) is provided to the user, the user enters one or more lines of text separated by line delimiters, and access to the storage device is initiated by the user with a separate interface control such as an 'enter password(s)' button. In another embodiment, multiple passwords are input on a single display line.

Subsequent to providing 310 a password prompt, the method continues by receiving 320 a character sequence 135 generated by the user. The character sequence 135 may include one or more passwords and associated delimiters. In the depicted embodiment, the method continues by encoding 330 a symbol stream.

Encoding 330 a symbol stream involves converting the character sequence 135 received from the user to a symbol stream 145 acceptable to the storage device. In one embodiment, the storage device may accept the character sequence 135 without conversion and the encoding step 340 may essentially be omitted. In another embodiment, encoding 330 involves encrypting the character sequence 135 to provide an encrypted symbol stream 145 and additional security to the storage access system 100.

Not only does encrypting the symbol stream 145 further contribute to the security of the system because the symbol stream 145 is encrypted, but it also contributes to security by making the computing device 110 a necessary component to the overall storage access system 100. Making the computing device 110 a necessary component is advantageous because unauthorized persons often attempt to access a data storage device 150 by separating it from the computing device and transporting it to a different location.

The depicted storage access method 300 continues by generating 340 a timing pattern. In one embodiment, the timing pattern is generated by the timing generator 290 depicted in FIG. 2. In certain embodiments, generating 340 the timing pattern includes generating random timing for one or more designated random-timing symbols. In one embodiment, the timing of symbols is relative to a start symbol, and the start symbol may correspond to a selected ordinal position within the symbol stream 145.

Communicating 350 a symbol stream may include using information obtained from the timing generator 290 and encryption module 280 to communicate an encrypted symbol stream 145 to a data storage device with a specific timing pattern imposed on the symbols of the stream 145. Imposing a timing pattern improves the security of the storage access method 300 over previous solutions.

Figure 4:
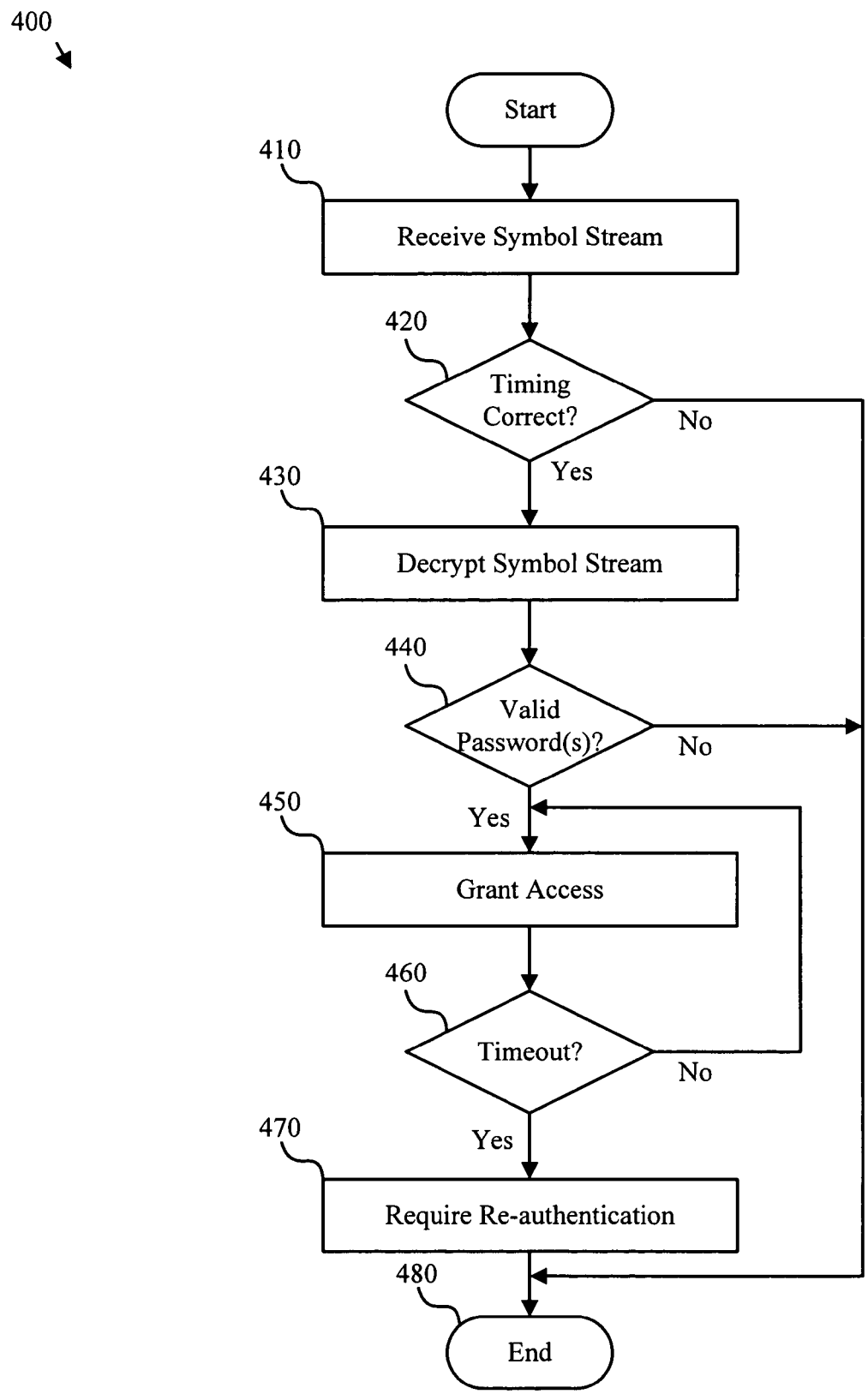
FIG. 4 is a flow chart diagram depicting one embodiment of a password authentication method of the present invention.

FIG. 4 is a flow chart diagram depicting one embodiment of a password authentication method 400 of the present invention. The depicted method 400 includes receiving 410 a symbol stream, testing 420 for correct timing, decrypting 430 the symbol stream, testing 440 for valid password data, granting access 450, testing 460 for a timeout, and requiring 470 re-authentication. The password authentication method 400 may be conducted by the data storage device 200, or the like, to protect the storage device from unauthorized access.

The method 400 begins by receiving 410 a symbol stream containing password data such as the symbol stream 145. The symbol stream may be encrypted and received from a computing device or the like. Receiving 410 the symbol stream may also include collecting timing information for each symbol in the symbol stream.

The method 400 continues by testing 420 for correct timing. In one embodiment, testing for correct timing involves detecting whether selected symbols are received within specific timing windows. In certain embodiments, the duration of the timing windows may be sufficiently short (measured in microseconds) as to require the assistance of an appropriately configured hardware in order to meet the required timing constraints. If the timing is incorrect, the method 400 ends 480 and access to the storage device 200 is denied. If the timing is correct, the password authentication method 400 continues processing.

In certain embodiments, the password authentication method 400 may proceed by decrypting 430 the symbol stream 145 to convert the symbol stream to readable data. Subsequently, the method continues by testing 440 for valid password data. In one embodiment, testing 440 for valid password data involves comparing the password data to one or more authentication sequences stored within the storage device 200. If the password data is invalid the method ends 480.

If the password data is valid, the method 400 continues by granting access 450 to the data storage device 200 and the data contained therein. In certain embodiments, the method 400 includes testing 460 for a timeout and requiring 470 re-authentication if a timeout has occurred. If no timeout has occurred, the depicted method 400 continues by looping to step 450 and continuing to grant access to the data storage device. If a timeout has occurred, the depicted method 400 requires re-authentication by exiting the method 400 and thereby blocking access to the data storage device 200.

Figure 5:
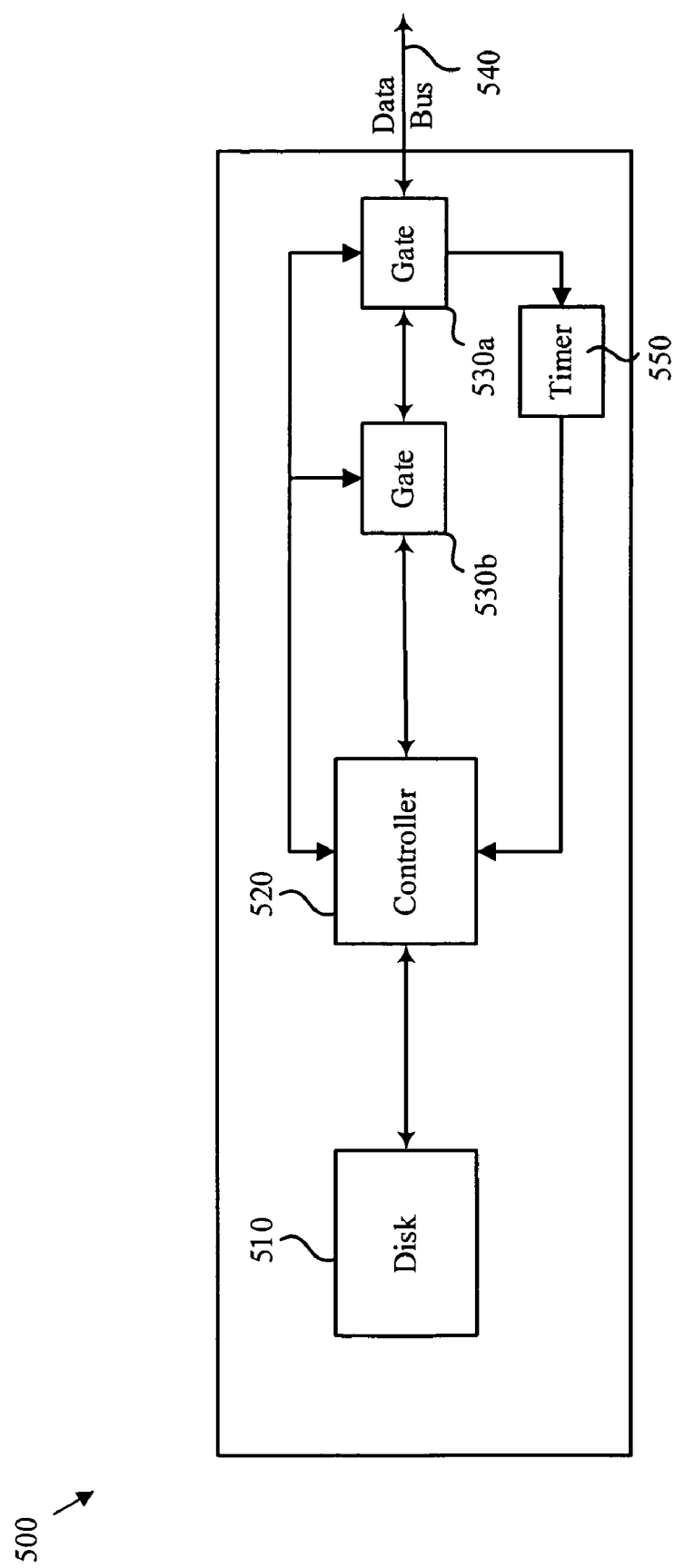
FIG. 5 is a block diagram depicting one embodiment of a storage device of the present invention.

FIG. 5 is a block diagram depicting one embodiment of a storage device 500 of the present invention. The depicted storage device 500 includes a disk 510, a controller 520, and a set of gates 530 that gate access to a bus 540. The storage device 500 is a particular example of the data storage device 150 depicted in FIG. 2. The storage device 500 requires a double password with specific timing between the passwords as a condition to granting access to the device.

In the depicted embodiment, the disk 510 is a data bearing medium configured to support read and write operations generated by the controller 520. The controller 520 may be configured to validate the timing and validity of password data provided to the gates 530 by the databus 540. In the depicted embodiment, the gates 530 provide a double locked system that requires two passwords to gain access to the disk 510. Other embodiments include triple or quadruple gates for additional security.

In addition to correct passwords, proper timing between passwords is required to gain access to the disk 510. In certain embodiments, specialized support circuitry facilitates timing resolutions of less than 1 microsecond. In one embodiment, the second password must be received within a timing window of less than 3 microseconds after a specified delay that is greater than 10 milliseconds and less than one second. In the aforementioned embodiment, more than 300,000 timing possibilities exist between each symbol thereby significantly increasing the permutations required to gain unauthorized access as well as the time required to test each permutation.

Figure 6:
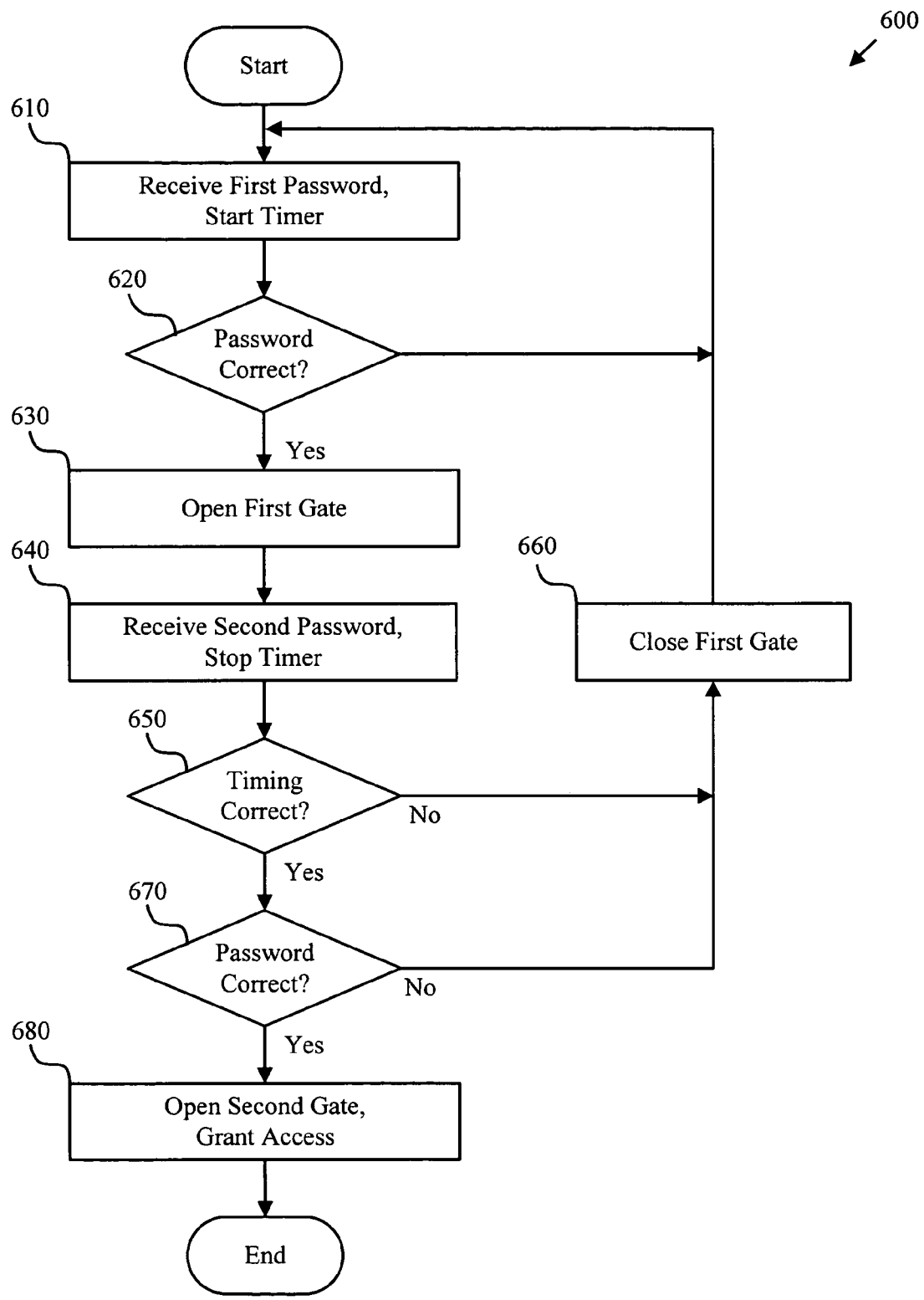
FIG. 6 is a flow chart diagram depicting one embodiment of a password authentication method of the present invention.

FIG. 6 is a flow chart diagram depicting one embodiment of a password authentication method 600 of the present invention. As depicted, the method 600 includes receiving 610 a first password and starting a timer, testing 620 if the first password is correct, opening 630 the first gate, receiving 640 a second password and stopping the timer, testing 650 if the timing between the passwords is correct, closing 660 the first gate, testing 670 if the second password is correct, opening 680 the second gate and granting access to the data storage device. The password authentication method 600 is a particular example of the password authentication method 400 depicted in FIG. 4 that may be conducted in conjunction with the storage device 500 depicted in FIG. 5.

Receiving 610 a first password may include latching password data into a first gate 530a of the gates 530 and starting the timer 550. Subsequently, the method 600 continues by testing 620 if the first password is correct. If the first password is incorrect, the method 600 loops to step 610. If the first password is correct, the method continues by opening 630 the first gate. Opening 630 the first gate may occur without notifying the accessing party that the first password is correct.

Subsequently, the method continues by receiving 640 the second password and capturing the timing between passwords, testing 650 if the password timing is correct, and testing 660 if the second password is correct. In one embodiment, testing 650 if the password timing is correct involves comparing the value in the timer 550 against a timing window.

If the password timing is incorrect or the second password is incorrect, the method continues by closing 660 the first gate, looping to step 610, and waiting for a valid first password. If the password timing is correct and the second password is correct, the method continues by opening 680 the second gate, granting access to the storage device and terminating 690.

The present invention improves data security for storage devices. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for controlling access to a data storage device, the apparatus comprising:

an interface module configured to receive a character sequence from a user in response to providing a password prompt to the user, the character sequence comprising a plurality of passwords received in response to a single password prompt, the plurality of passwords comprising delimiters that separate each password within said plurality of passwords, wherein the number of passwords prompted is different than the number of passwords required to gain access to the data storage device and wherein each password is configured to open a corresponding gate to gain access to the data storage device, wherein a set of gates that gate access to a databus are included in said data storage device; and wherein a storage access module opens a first databus gate corresponding to a first password without notifying an accessing party that the first password is correct; and a storage access module configured to communicate a symbol stream corresponding to the character sequence to a password-protected data storage device wherein at least one selected symbol within the symbol stream is transmitted within a specified timing window.

2. The apparatus of claim 1, wherein the storage access module requires at least two passwords from the plurality of passwords in order to gain access to the data storage device and the storage access module opens a first gate corresponding to a first password without notifying an accessing party that the first password is correct.

3. The apparatus of claim 1, wherein the at least one selected symbol corresponds to a password.

4. The apparatus of claim 1, wherein the at least one selected symbol corresponds to a password delimiter.

5. The apparatus of claim 1, wherein the timing window is relative to a start symbol.

6. The apparatus of claim 5, wherein the start symbol corresponds to a selected ordinal position within the symbol stream.

7. The apparatus of claim 1, further comprising a timing generator configured to generate the timing window.

8. The apparatus of claim 7, wherein the timing generator is further configured to generate random timing for at least one random-timing symbol.

9. The apparatus of claim 1, further comprising an encryption module configured to encrypt the symbol stream.

10. The apparatus of claim 9, wherein the encryption module is further configured to receive a new encryption key.

11. The apparatus of claim 1, wherein the interface module is further configured to defer notification of successful access to the data storage device for a random interval.

12. A system for controlling access to a data storage device, the system comprising:

a display configured to display a password prompt to a user;

an input device configured to provide means for inputting a character sequence, the character sequence comprising a plurality of passwords received in response to a single password prompt, the plurality of passwords comprising delimiters that separate each password within said plurality of passwords, wherein the number of passwords prompted is different than the number of passwords required to gain access to the data storage device and wherein each password is configured to open a corresponding databus gate to gain access to the data storage device, and wherein a set of gates that gate access to a databus are included in said data storage device;

a processing module configured to communicate a symbol stream corresponding to the character sequence to a password-protected data storage device wherein at least one selected symbol within the symbol stream is transmitted within a specified timing window; and a storage access module that requires at least two passwords from the plurality of passwords in order to gain access to the data storage device, wherein the storage access module opens a first databus gate corresponding to a first password without notifying an accessing party that the first password is correct.

13. The system of claim 12, wherein the processing module, input device, and display collectively comprise a computing device selected from the group consisting of a computer, a workstation, a pocket computer, an appliance, a media player, a mobile telephone, and an electronic organizer.

14. The system of claim 12, wherein the means for inputting a character sequence is selected from the group consisting of a keyboard, a keypad, a number pad, a mouse, a touch pad, a touch screen, and a stylus.

15. The system of claim 12, wherein the display is selected from the group consisting of a monitor, a liquid crystal display, a terminal, and a television.

16. The system of claim 12, wherein the processing module is further configured to randomize a transmission time of at least one random-timing symbol.

17. The system of claim 12, wherein the processing module is configured to defer notification of successful access to the data storage device for a random interval.

* * * * *